United States Patent [19]

Cairns

[11] Patent Number: 5,161,673
[45] Date of Patent: Nov. 10, 1992

[54] CONVEYOR ROLLER

[75] Inventor: James W. Cairns, Aston, Pa.

[73] Assignee: Nulo Plastics, Inc., Aston, Pa.

[21] Appl. No.: 725,775

[22] Filed: Jul. 2, 1991

[51] Int. Cl.⁵ .................................................. B65G 13/06
[52] U.S. Cl. .................................................. 198/781
[58] Field of Search ............................................ 198/781

[56] References Cited

U.S. PATENT DOCUMENTS

| | | |
|---|---|---|
| 3,951,255 | 4/1976 | Shuttleworth . |
| 4,006,815 | 2/1977 | Werntz . |
| 4,314,629 | 2/1982 | Shilander . |
| 4,325,474 | 4/1982 | Rae ................ 198/781 |
| 4,331,228 | 5/1982 | Galarowic ........ 198/781 X |
| 4,357,249 | 11/1982 | Mellor . |
| 4,366,899 | 1/1983 | Doro . |
| 4,524,861 | 6/1985 | Matsushita ........ 198/781 |
| 4,706,801 | 11/1987 | Vessey . |
| 4,798,282 | 1/1989 | Sperduti et al. ... 198/781 |

Primary Examiner—D. Glenn Dayoan
Attorney, Agent, or Firm—Cushman, Darby & Cushman

[57] ABSTRACT

An article transporting conveyor roller having a frictional drive transmission component as the last link between the drive power source and the live portion of the roller. The frictional surface of the drive component extends around the entire inner surface of the live portion of the roller so as to provide a true linear relationship between the weight of the article conveyed and the frictional force of the drive component. The frictional drive transmission component allows the live portion of the roller to stop moving in the event of accumulation of the articles to be transported.

11 Claims, 1 Drawing Sheet

CONVEYOR ROLLER

BACKGROUND OF THE INVENTION

1. Field of the invention

This invention relates to rollers for conveyor systems. In particular the present invention is a novel conveyor roller with frictional drive that minimizes the likelihood that the articles conveyed will be damaged as a result of accumulation.

2. Description Of The Related Art

Many different styles of conveyor roller systems have addressed the problem of product damage in the event of accumulation on the conveyor. The most popular of such systems is known as a line shaft conveyor. FIG. 1 illustrates one roller in a typical line shaft conveyor system. In an actual system, many such rollers are positioned adjacent each other in order to move the product along the conveyor system.

The line shaft conveyor system has two rails 12 that extend along the length of the system (normal to the plane of the page in FIG. 1). Extending between the rails 12 is stationary shaft 14. Roller 16 is mounted on shaft 14 by virtue of two bearing elements 18. Roller 16 is thus free to rotate about shaft 14. Line shaft 20 extends along the length of the conveyor system and is rotationally driven by the conveyor power source (not illustrated). Pulley 22 is slip-fitted on line shaft 20 and transmits rotation to roller 16 by virtue of belt 24. Groove 26 is formed in roller 16 so as to avoid interference between belt 24 and products to be conveyed.

In order to allow roller 16 to stop rotating when products accumulate, the force of stationary products on the conveyor that have accumulated exceeds this frictional force between pulley 22 and line shaft 20, there will be slippage at the interface between pulley 22 and line shaft 20. Accordingly, the rollers of the line shaft system will not rotate when accumulation occurs.

Several limitations of a line shaft conveyor system have become apparent. Because of its many moving parts, the line shaft system is difficult and expensive to maintain. Ball bearings utilized in this type of system are prone to failure. This is especially true in food and chemical application where fluids and particles may be present in the environment that clog or dry out the bearings of this type of system. In addition, belts may break or there may be a loss of driving force to the belts becoming stretched or greasy. Also, the frictional force between the pulley and line shaft remains constant, regardless of the weight of the article being conveyed. Therefore, the slippage does not occur at the correct time for all types of articles and damage may occur during accumulation of articles on the conveyor.

Many complex systems have been developed in an effort to overcome the shortcomings of the line shaft type system. In particular, systems utilizing ball clutches or plastic on plastic sliding surfaces have been proposed. These types of systems, however, are typically complex and expensive (ball clutch) or unable to carry adequate loads without undue wear (plastic on plastic sliding surfaces).

SUMMARY OF THE INVENTION

The present invention has the object of solving the problems associated with the prior art by providing a frictional surface, to permit accumulation without damage at the roller interface as the last link between the drive chain and the roller. With such a configuration, the belt and its associated problems are eliminated. In particular, the frictional force imparted to the roller is proportional to the weight of the article being conveyed. Accordingly, the frictional force can be adjusted through design criteria to provide the correct amount of force for every article being conveyed.

By utilizing a particular high-slip surface at the roller interface, the present invention allows for the frictional interface to be distributed over a large surface area, thus giving a more reliable and consistent interface and move stable assembly. Further, wear is distributed contributing to the longevity of the system. In accordance with the invention, however, a wide variety of high-slip materials may be utilized at the frictional interface.

Other objects, features and characteristics of the present invention, as well as the methods of operation and function of the related elements of the structure, and the combination of parts and economies of manufacture, will become more apparent upon consideration of the following detailed description and the appended claims with reference to the accompanying drawings all of which form a part of this specification.

DETAILED DESCRIPTION OF THE PREFERRED EMBODIMENT

Figure 1:
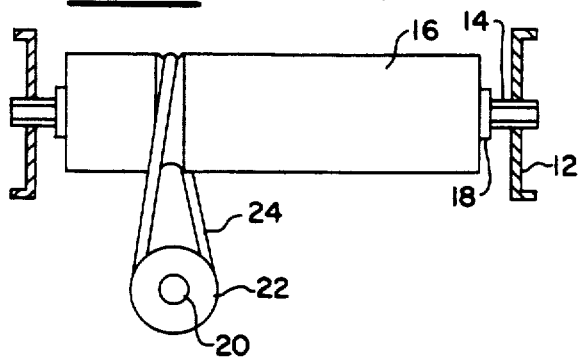
FIG. 1 is an elevational view of a single roller of a prior art line shaft conveyor system.
Figure 2A:
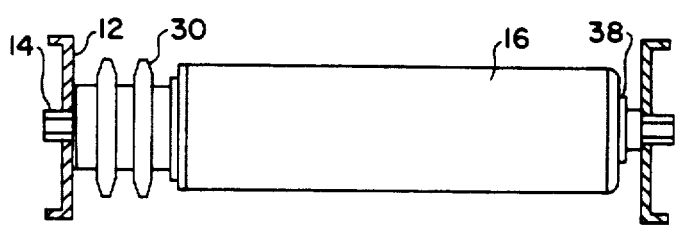
FIG. 2A is an elevational view of one embodiment of the conveyor roller of the present invention.
Figure 3A:
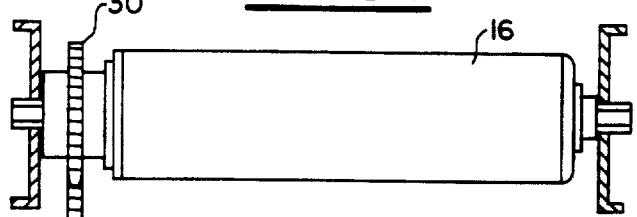
FIG. 3A is an elevation view of another embodiment of the conveyor roller of the present invention.
Figure 4A:
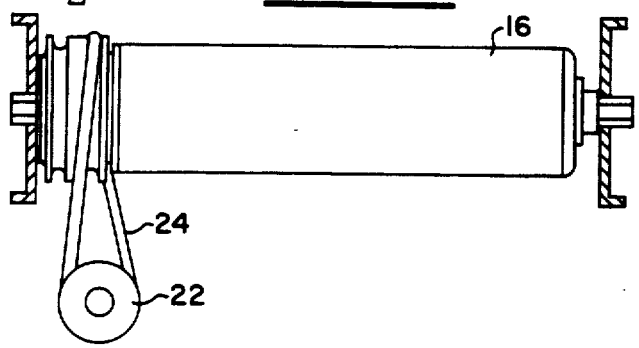
FIG. 4A is an elevational view of yet another embodiment of the conveyor roller of the present invention.

FIGS. 2A, 3A and 4A illustrate the preferred embodiments of the conveyor roller of the present invention. Rails 12 (extending normal to the plane of the page) support stationary shaft 14. Roller 16 is rotatably supported by bearing element 38 at one end. Bearing element 38 is preferably a self lubricating type of material of the type disclosed in U.S. Pat. No. 4,357,249 which disclosure is incorporated herein by reference. However, bearing element 38 may be of any type that allows free rotation about shaft 14, such as a roller bearing, a low friction bushing, or the like.

Proximate the opposite end of roller 16, sprocket 30 is rotatably mounted on shaft 14. A similar bearing element (not shown) may be utilized in order to allow free rotation of sprocket 30. sprocket 30 receives torque via a chain from an external source of rotation. In the alternative, sprocket 30 may be replaced by a pulley, frictional drive wheel, or any other type of power transmission component suitable to the application.

Figure 2B:
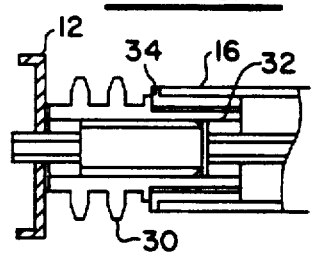
FIG. 2B is a partial end view of the conveyor roller of FIG. 6A.
Figure 3B:
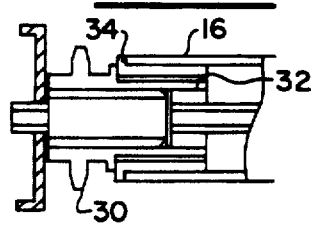
FIG. 3B is a partial end view of the conveyor roller of FIG. 7A.
Figure 4B:
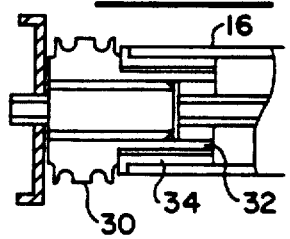
FIG. 4B is a partial end view of the conveyor roller of FIG. 8A.

FIGS. 2B, 3B and 4B are views of a portion of the preferred embodiments illustrating the frictional interface. Integrally attached to sprocket 30, and extending into roller 16, is drive shaft 32. Drive shaft 32 preferably has a metal sleeve or coating, or the like, on its outer surface. Drive shaft 32 may extend into roller 16 to varying lengths depending on application specific variables. It is preferred that drive shaft 32 extend at least far enough into roller 16 to allow for adequate load distribution and reliable mechanical support of roller 16. This distance is usually between 1 and 3 times the diameter of drive shaft 32. Drive shaft 32 preferably has a metal sleeve but may be constructed of or coated with any material that results in the desired coefficient of friction at its interface with frictional sleeve 34. In addition, drive shaft 32 may have a removable sleeve that can be interchanged with others or left off entirely in order to achieve the desired coefficient of friction. Frictional sleeve 34 is fixedly attached to an inner surface of roller 16. Accordingly, the frictional torque transmission surface is defined by the inner surface of frictional sleeve 34 and the outer surface of drive shaft 32 or any sleeve or coating thereon.

Frictional sleeve 34 can be constructed of any low friction, wear resistant material. However it is preferable that frictional sleeve be constructed a homogeneous blend of about 70 to 95 percent of an ultra high molecular weight ethylene polymer and about 5 to 30 percent of a solid lubricant. Such a material is disclosed in U.S. Pat. No. 4,357,249. While the preferred embodiment specifies materials suitable for use as drive shaft 32 and frictional sleeve 34, other materials can be selected so as to yield desired coefficient of friction at the frictional interface of the two members.

The inner diameter of frictional sleeve 34 is preferably only slightly larger than the outer diameter of drive shaft 32, including any sleeve or coating thereon. This enables the frictional torque transmission surface to extend substantially around the outer surface of drive shaft 32 and frictional sleeve 34. Preferably, frictional sleeve 34 and drive shaft 32 are sized so as to define a transmission surface that extends around 30% to 50% of the circumference of drive shaft 32. This continuous contact around the portion of the circumference, and along the entire length, of drive shaft 32 allows the present invention to yield a frictional force that it is truly proportional to the weight of the article being transported.

Many variations of the preferred embodiment are possible without exceeding the scope of the present invention. For example, instead of a sprocket adapted to chain drive, the present invention could be adapted to a belt drive or other known means of power transmission. In addition, successive rollers in a conveyor system could be daisy chained, each roller getting its power from the successive roller. Also, a variety of materials could be selected for each component depending on application specific variables such as environment, weight of articles to be conveyed, material of articles conveyed, and the like.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An article transporting conveyor roller, comprising:
    a fixedly mounted shaft;
    a roller coaxially mounted to said shaft for imparting motion to an article to be transported, said roller having a longitudinal axis and first and second ends;
    first supporting means for rotatably supporting said first end of said roller; and
    second supporting means for rotatably supporting said second end of said roller, comprising:
        a cylindrical element which extends into said second end, coaxially to said shaft, said cylindrical element having an outer diameter substantially equal to an inner diameter of said second end, said cylindrical element extending into said second end a distance equal to between about 1 and 3 times said outer diameter;
        an outer surface of said cylindrical element and an inner surface of said second end of said roller defining a frictional contact surface that extends around between about 30 and 50 percent of the circumference of said cylindrical element,
        at lest one of said inner surface and said outer surface being formed from a homogeneous blend of an ultra high molecular weight ethylene polymer and a lubricant.

2. An article transporting conveyor roller as claimed in claim 1, further comprising:
    means for causing said second support means to rotate about a longitudinal axis thereof.

3. An article transporting conveyor roller as claimed in claim 2 wherein said means for causing said second support to rotate is a sprocket.

4. An article transporting conveyor roller as claimed in claim 2, wherein said means for causing said second support to rotate is a pulley.

5. An article transporting conveyor roller as claimed in claim 1, wherein said homogeneous blend consists of between 70 and 90 percent of said ultra high molecular weight polymer.

6. An article transporting conveyor roller as claimed in claim 1, wherein the other of said inner and said outer surfaces is constructed of metal.

7. An article transporting conveyor roller as claimed in claim 2 further comprising:
    means for transmitting rotational motion to an adjacent roller.

8. An article transporting conveyor roller as claimed in claim 7 wherein said transmitting means is a sprocket.

9. An article transporting conveyor roller as claimed in claim 7 wherein said transmitting means is a pulley.

10. An article transporting conveyor roller as claimed in claim 1, wherein said contact surface extends along a substantial portion of the length of said cylindrical element.

11. A method of forming an article transporting conveyor roller, comprising the steps of:
    providing a fixedly mounted shaft;
    providing a roller coaxially mounted to said shaft for imparting motion to an article to be transported, said roller having a longitudinal axis and first and second ends;
    providing first supporting means for rotatably supporting said first end of said roller;
    providing second supporting means for rotatably supporting said second end of said roller, said second supporting means including:
        a cylindrical element which extends into said second end, coaxially to said shaft, said cylindrical element having an outer diameter substantially equal to an inner diameter of said second end, said cylindrical element extending into said second end a distance equal to between about 1 and 3 times said outer diameter, an outer surface of said cylindrical element and an inner surface of said second end of said roller defining a frictional contact surface that extends around between about 30 and 50 percent of circumference of said cylindrical element; and forming at least one of said inner surface and said outer surface from a homogeneous blend of an ultra high molecular weight ethylene polymer and a lubricant so as to provide a predetermined coefficient of friction at said frictional contact surface, whereby said inner surface an said outer surface slip when said cylinder is rotationally driven and articles being conveyed have accumulated so as to resists movement of said roller.

* * * * *

UNITED STATES PATENT AND TRADEMARK OFFICE
CERTIFICATE OF CORRECTION

PATENT NO. : 5,161,673
DATED : November 10, 1992
INVENTOR(S) : CAIRNS

It is certified that error appears in the above-identified patent and that said Letters Patent is hereby corrected as shown below:

On the Title Page, "[73] Assignee: Nulo Plastics"
    should be --[73] Assignee: Nolu Plastics--.

Signed and Sealed this

First Day of March, 1994

Attest:

BRUCE LEHMAN

Attesting Officer          Commissioner of Patents and Trademarks